Sept. 12, 1961  H. HAUTMANN ET AL  2,999,446
AUTOMATIC IRIS CONTROL AND INDICATING UNIT FOR CAMERAS
Filed June 19, 1958  2 Sheets-Sheet 1

INVENTORS
HEINRICH HAUTMANN
ERWIN PFAFFENBERGER
Nolte, & Nolte
ATTORNEYS

Sept. 12, 1961  H. HAUTMANN ET AL  2,999,446
AUTOMATIC IRIS CONTROL AND INDICATING UNIT FOR CAMERAS
Filed June 19, 1958  2 Sheets-Sheet 2
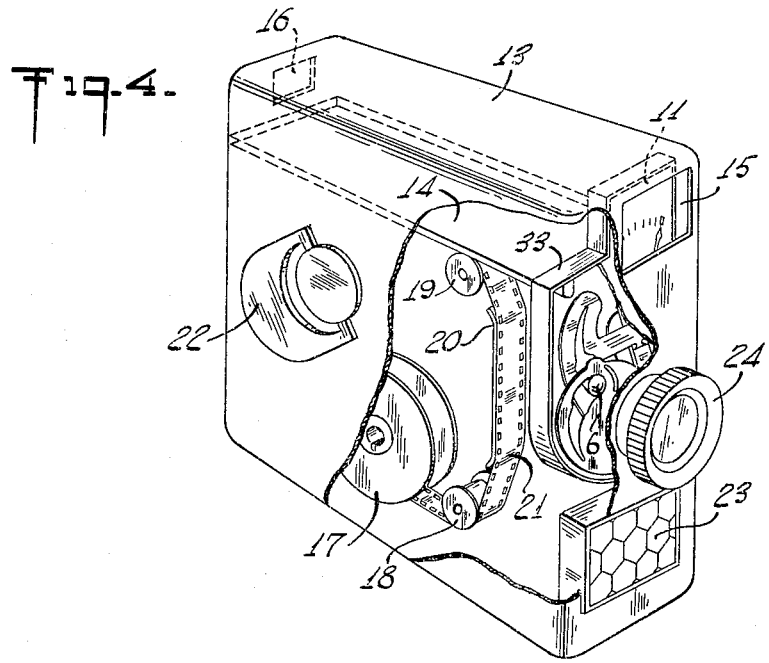
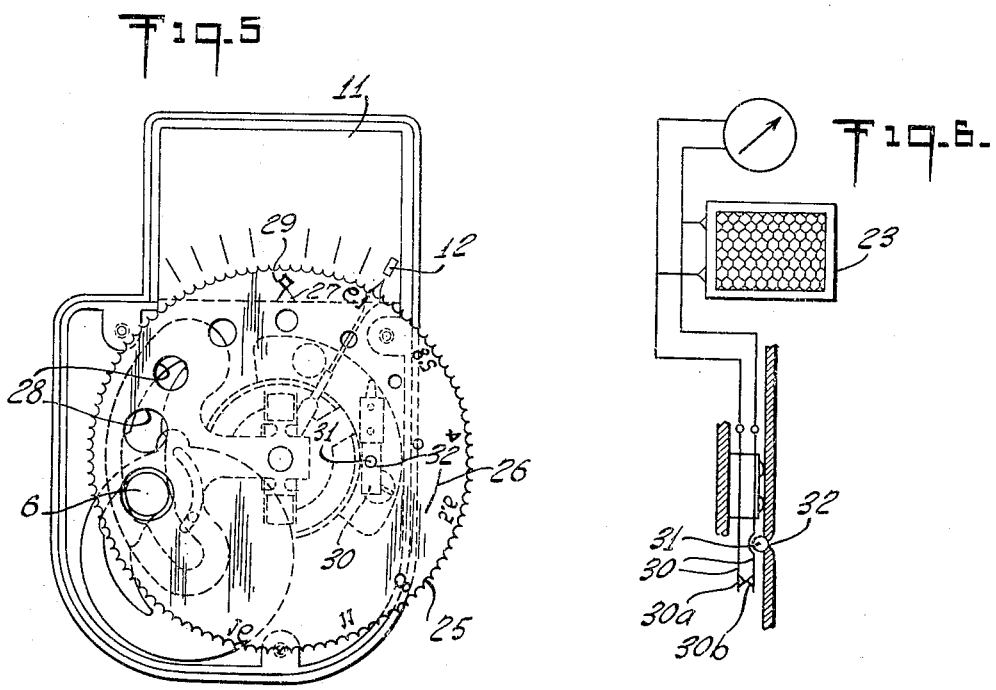
INVENTORS
HEINRICH HAUTMANN
ERWIN PFAFFENBERGER
Nolte, & Nolte
ATTORNEYS

United States Patent Office 2,999,446
Patented Sept. 12, 1961

2,999,446
AUTOMATIC IRIS CONTROL AND INDICATING UNIT FOR CAMERAS
Heinrich Hautmann and Erwin Pfaffenberger, Erlangen, Bavaria, Germany, assignors to P. Gossen & Co. G.m.b.H, Erlangen, Bavaria, Germany
Filed June 19, 1958, Ser. No. 743,073
Claims priority, application Germany Jan. 25, 1958
2 Claims. (Cl. 95—64)

This invention relates to an automatic iris control and indicating unit adapted for use in photographic cameras having a built-in photocell.

Photoelectric iris or diaphragm controls for photographic cameras of all kinds are known, in which a measuring mechanism of a built-in exposure meter directly effects the adjustment of the iris in dependence upon the brightness of an object to be photographed and other exposure factors.

There has been proposed, for example, an iris control in which a gear is mounted on the axle of a rotary coil type measuring mechanism to drive two disk-shaped iris blades provided with gear rims. Each of the two iris blades is provided with a sickle-shaped slot. The centers of rotation of the iris blades are disposed relatively to each other so that the two slots intersect at approximately right angles in the ray path of the optical lens system and according to their position form a more or less large lens aperture.

However, an arrangement of this kind has disadvantages which are due to the fact that the rotary motion of the coil of the measuring mechanism is transmitted to the iris blades by toothed gearing. Every time the brightness is measured, the coil of the measuring mechanism rotates through an angle $\alpha$, the extent of which is proportional to the intensity of light energy impinging on the photoelectric cell. At the same time the blades rotate through angles $n \cdot \alpha$ or $m \cdot \alpha$, respectively, $n$ and $m$ being constants, the amount of which is determined by the transmission ratio between the gear on the axle of the rotary coil and the gear rims of the blades. Therefore, the rotary motion of each blade and of the slot therein has a "characteristic" which coincides with the indicating characteristic of the exposure meter. So, for example, when the coil of the measuring mechanism rotates from its position of rest through one third or one half of its total indicating angle provided for the measurement of exposure, the slots in the blades will likewise rotate through one third or one half of their total angle of rotation. This interrelationship, which must be observed when determining the form of the blade slots, entails however, a limitation of the constructional possibilities; so, for instance, in practice the blade slots will have relatively long arc lengths, that is they extend through a relatively large sector angle of the disk-shaped blades, thereby impairing the stability of the latter.

Another disadvantage of the known iris control with toothed gearing is to be seen in the fact that the disk-shaped blades with their gear rims have a relatively high weight, so that it is necessary to use a measuring mechanism with a high torque and a photoelectric cell with a relatively large effective surface.

A further disadvantage of the known device consists in that manual setting of the lens aperture is effected by means of a mechanism which engages a pointer associated with the measuring mechanism to thereby adjust the iris blades. It is desirable, however, that no mechanical force be exerted on the delicate parts of the measuring mechanism in order not to impair the proper functioning thereof.

The present invention sets out to overcome the aforementioned disadvantages by providing an automatic iris control and indicating unit for use in photographic cameras having a photocell, which comprises a housing, a measuring mechanism arranged in said housing and electrically connected with the photocell, said measuring mechanism including a core magnet, a short-circuit ring and a rotary coil mounted on an axle for rotation in accordance with an electric current generated by the photocell when light energy impinges thereon, a first iris blade mounted on said rotary coil and extending substantially normal to the axle thereof, a second iris blade extending in a plane parallel to and adjacent the first iris blade and mounted for rotation relative to said first iris blade, means for transmitting rotary motion from the first iris blade to the second iris blade as the first iris blade rotates with said coil, and a curved slot in each of said iris blades, said slots being arranged to intersect each other to define a lens aperture in dependence upon the light energy impinging on the photocell.

A characteristic feature of the invention consists in that the first iris blade is rigidly mounted on the rotary coil and the second iris blade is driven by said first iris blade. To this end a curved narrow slot may be provided in one of the iris blades, which slot is engaged by a pin provided on the other iris blade. This arrangement permits the relative rotary movement of the two iris blades and their iris defining slots to be determined in a simple way solely by the position and shape of the curved narrow slot so that the iris defining slots may be kept short and shaped for optimum function.

According to another feature of the invention, an apertured disk for manual setting of the lens aperture may be arranged to operate a contact means which renders the automatic iris control and indicating unit inoperative when the disk is used for manual aperture setting.

Preferred embodiments of the invention are illustrated by way of example in the accompanying drawings in which:

FIG. 4 is a perspective view, partly cut away, showing a home movie camera equipped with the iris control and indicating unit of FIG. 1;

FIG. 5 is a front view of the iris control and indicating unit of FIG. 1 combined with an apertured disk for manual aperture setting, and FIG. 6 is a diagrammatic view illustrating the operation of a contact controlled by the apertured disk of FIG. 5.

Figure 1:
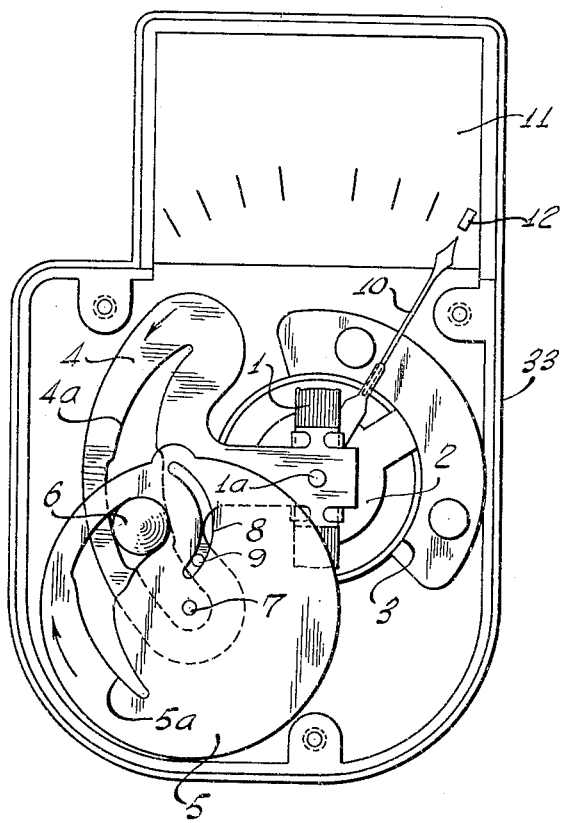
FIG. 1 is a front view of an automatic iris control and indicating unit according to the invention, including two aperture defining elements in the form of iris blades.

Referring now more particularly to the drawings, FIG. 1 shows an automatic iris control and indicating unit assembled in a common housing 33 which is adapted to be fitted in the front part of a camera. The iris control and indicating unit includes a conventional measuring mechanism of the moving coil type having a rotary coil 1 which is mounted on an axle 1a for rotation relative to a core magnet 2 and an iron ring 3. The structure of the moving coil measuring mechanism is well known in the art. The measuring mechanism is electrically connected in known manner to a photocell, not shown in FIG. 1. The coil 1 carries an iris blade 4 rigidly mounted thereon and cooperating with a second iris blade 5 which extends in a plane parallel to and adjacent the first blade 4. The blades 4 and 5 have suitably shaped slots or apertures 4a and 5a arranged to intersect each other in front of a lens 6 of the camera to define the lens aperture as will be described hereinafter. The iris blade 5 is mounted for rotation about a pivot 7 which projects through the slot 4a in the blade 4. The blade 5 is furthermore provided with a curved narrow slot 8 in which a pin 9 carried by the first blade 4 engages for the purposes set forth. The spacing between the axle 1a and the pivot and the arrangement and shape of the slots 4a and 5a are so chosen that the latter intersect each other at substantially right angles. A pointer 10 is rigidly mounted on the coil 1 or its axle 1a and arranged to sweep over a scale provided on a window 11. The window 11 defines the forward end of a view finder compartment provided in the camera as will be described with reference to FIG. 4.

The operation of the device is as follows:

The measuring mechanism is energized in known manner by light energy impinging on the photocell which generates an electric current. The electric current causes the coil 1 to rotate through an angle the size of which depends upon the degree of brightness at that particular time. As the iris blade 4 is rigidly mounted on the coil 1, it is taken along in the direction of movement of the coil while the pin 9 engaging in the curved narrow slot 8 of the second iris blade 5 causes the latter to move in the opposite direction. Here, it will be noted that the extent of the movement of the blade 5 relative to the blade 4 is determined solely by the position and shape of the curved slot 8 in the blade 5. In this manner the device effects the automatic setting of the proper lens aperture which is defined by the intersecting slots 4a and 5a. As the pointer 10 is rigidly connected with the rotary coil 1 or the axle 1a thereof, it indicates the angular position of the coil which is proportional to the lens aperture. Therefore, the scale on the window 11 is preferably graduated in terms of lens aperture in such a manner that the aperture settings can be read at any time by simply looking through the view finder compartment of the camera.

The iris control and indicating unit is illustrated in FIG. 1 in a position which occurs when no light impinges on the photocell or when the latter is switched off. At this time the pointer 10 is positioned on a zero mark 12 of the scale and the intersecting slots 4a and 5a in the blades 4 and 5 define the maximum lens aperture. In this position of the measuring mechanism, the zero position can be corrected if required.

Figure 2:
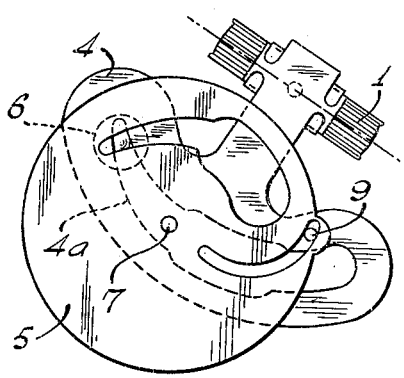
FIG. 2 is a detail of FIG. 1, showing the iris blades in a position defining a relatively small lens aperture.

FIG. 2 shows the blades 4 and 5 when they have moved to a point short of the other extreme position in which the slots 4a and 5a would define the smallest possible lens aperture.

Figure 3:
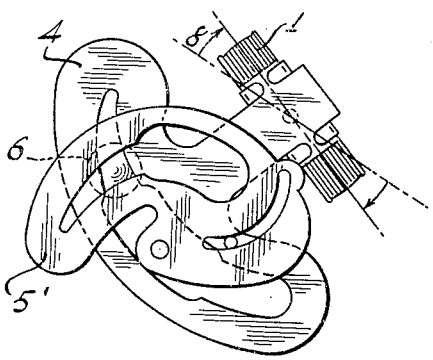
FIG. 3 is a view similar to FIG. 2 but showing the iris blades in a position defining a medium size aperture, one of the blades being of modified shape.

While FIGS. 1 and 2 show the blade 5 to be of substantially circular disk-shape, FIG. 3 shows a preferred modification in which a blade 5¹ has been cut away so as to leave only those portions which are absolutely necessary for the proper functioning of the unit. This particular shape of the blade 5¹ distinguishes advantageously over the circular disk-shape of the blade 5 in that it is of considerably lighter weight and requires less space within the unit. FIG. 3 illustrates the parts in a position in which they define a medium size lens aperture after the rotary coil 1 has turned through a small angle α in the direction of the arrows from the position shown in FIG. 2.

FIG. 4 shows the iris control and indicating unit of FIG. 1 fitted in a home movie camera generally designated by 13. The top of the camera forms a view finder compartment which is separated from the interior of the camera by a partition wall 14. The view finder compartment has front and rear windows 15 and 16, respectively, and the window 11 of the iris control and indicating unit is arranged directly behind the front window 15 of the view finder compartment. It will be readily apparent that when using the camera the aperture settings can be easily read from the scale on the window 11. The interior of the camera accommodates in known manner film spools, only one of which is shown and designated by 17, runner rollers 18 and 19, and a pressure plate 20 for a film 21. Other parts of the known film transporting mechanism have been omitted from the drawings for the sake of clarity. A hinged knob or grasp 22 for winding a spring mechanism, not shown, is provided in known manner on one side of the camera. A photocell 23 provided with a baffle and reticular lens is fitted in the front wall of the camera underneath a tube 24 mounting part of the optical lens system of the camera. The photocell 23 is electrically connected in known manner with the measuring mechanism of the iris control and indicating unit.

As shown in FIG. 5, an apertured disk 25 is rotatably mounted in front of the iris control and indicating unit of FIG. 1 to allow manual adjustment of the lens aperture as will be described hereinafter. The apertured disk 25 is made from transparent plastic material with a central portion which up to a circumferential line 26 has been rendered impervious to light by the application of a preferably black varnish, leaving only a narrow transparent zone adjacent the periphery of the disk 25 so that dark characters provided on this transparent zone to indicate the manually set aperture, may be clearly identified with the aid of a fixed index mark 27 when looking through the view finder. A series of suitably spaced apertures 28 with different diameters are formed in the central portion of the disk 25 in such a manner that manual rotation of said disk will bring these apertures 28 successively in front of and concentric with the lens 6 to define a particular lens aperture. FIG. 5 illustrates a condition in which the device is switched in for automatic aperture setting, while the disk 25 for manual setting is in its inoperative position which is indicated on the transparent zone of the disk by an asterisk 29 adjacent the index mark 27. In this position an aperture which is somewhat larger than the maximum lens aperture lies in front of the lens 6 so as to permit automatic aperture setting. Below disk 25 an electrical contact is provided which consists of the two springs 30a and 30b illustrated in FIG. 6. These two contact springs are connected with the circuit consisting of photocell 23 and the rotary coil 1. For actuating the contact a small ball 31 is placed between spring 30b and disk 25. Moreover, disk 25 has a hole 32 in which ball 31 can engage. Hole 32 is so positioned on disk 25 that the ball engages when the disk 25 is in the position shown in FIGS. 5 and 6. In this case, spring 30b is lifted away from spring 30a; the contact is open and in no way affects the measuring circuit. In this position, which is the setting for "automatic aperture control" the rotary coil and therewith the disk blades 4 and 5 will be displaced according to light incidence on the photocell.

When, however, a certain iris aperture is to be set manually, for instance, an aperture f=2.8, disk 25 has to be turned counterclockwise until the number 2.8 coincides with the index mark 27; this can be observed through the view finder. In this case the corresponding aperture in disk 25 will be in line with the light beam passing through lens 6.

By this rotation, the hole 32 for engagement with the ball has been displaced, too. Upon disengagement from hole 32, ball 31 has moved toward contact spring 30b and forced the latter toward the left side so that it contacts spring 30a. Thereby, the measuring circuit is short-circuited and thus without current. Since as known, every measuring device containing a rotary coil has a return spring to provide a counter rotating force (in the drawings this has not been illustrated for the sake of simplicity), the force of the return spring will cause the rotary coil to take up zero position which is indicated by mark 12. When, therefore, the iris is manually set, the automatic control is switched off by short-circuiting the measuring circuit.

Although preferred embodiments of the invention have been described in detail herein and illustrated in the accompanying drawings, it is to be understood that the invention is not limited to these precise embodiments, particularly with respect to the materials specified in connection therewith, and that various changes and modifications may be effected therein, without departing from the scope or spirit of the invention as defined in the appended claims.

We claim:

1. An automatic iris control and indicating unit for photographic cameras, comprising a photocell, a housing, a measuring mechanism of the moving coil type electrically connected to the photocell, the coil of the measuring mechanism being mounted in said housing for rotation in accordance with an electric current generated by the photocell when light energy impinges thereon, a first iris blade having an aperture, a connection rigidly mounting said first iris blade on the moving coil in a plane substantially normal to the axis of rotation thereof, a projecting element on said first iris blade, a second iris blade having an aperture, means for mounting said second iris blade in a plane parallel to and adjacent the first iris blade and for rotation relative to said first iris blade, said second iris blade having a curved slot, and the projecting element of said first iris blade projecting into said slot for transmitting the rotary motion of the moving coil to said second iris blade, said apertures being arranged jointly to define a lens aperture in dependence upon the light impinging on the photocell.

2. An automatic iris control and indicating unit as claimed in claim 1, wherein said projecting element is a pin.

References Cited in the file of this patent

UNITED STATES PATENTS

| | | |
|---|---|---|
| 2,209,639 | Tonnies | July 30, 1940 |
| 2,380,216 | Carter | July 10, 1945 |
| 2,662,457 | Fairbank | Dec. 15, 1953 |
| 2,841,064 | Bagby et al. | July 1, 1958 |

FOREIGN PATENTS

| | | |
|---|---|---|
| 698,573 | Great Britain | Oct. 21, 1953 |